(12) United States Patent
Nair et al.

(10) Patent No.: US 9,692,714 B1
(45) Date of Patent: Jun. 27, 2017

(54) SWITCHING FABRIC TOPOLOGY BASED ON TRAVERSING ASYMMETRIC ROUTES

(71) Applicant: Juniper Networks, Inc., Sunnyvale, CA (US)

(72) Inventors: Vijit V. Nair, San Jose, CA (US); Sek Wing Siu, San Lorenzo, CA (US); Raghuraman Thirumalairajan, Pleasanton, CA (US); Sunil Mekad, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 269 days.

(21) Appl. No.: 14/570,433

(22) Filed: Dec. 15, 2014

(51) Int. Cl.
*H04L 12/50* (2006.01)
*H04L 12/947* (2013.01)
*H04L 12/933* (2013.01)

(52) U.S. Cl.
CPC ............ *H04L 49/25* (2013.01); *H04L 49/101* (2013.01)

(58) Field of Classification Search
CPC ............................. H04L 45/742; H04L 49/25
USPC .................................................... 370/401, 389
See application file for complete search history.

(56) References Cited

U.S. PATENT DOCUMENTS

| 4,713,803 A * | 12/1987 | Ambrosio ............. H04L 5/1423 370/288 |
| 2016/0119234 A1* | 4/2016 | Valencia Lopez ...... H04L 49/15 370/401 |

\* cited by examiner

*Primary Examiner* — Dang Ton
(74) *Attorney, Agent, or Firm* — Harrity & Harrity, LLP (57) ABSTRACT

A system may include a set of 4N packet processors and a switching fabric to interconnect the set of 4N packet processors. The switching fabric may include the following switching elements having a size of at least 3N×3N: a first switching element, a second switching element, a third switching element, and a fourth switching element. The first switching element may be directly connected to the second switching element and the third switching element, and may be indirectly connected to the fourth switching element. The second switching element may be directly connected to the fourth switching element, and may be indirectly connected to the third switching element. The third switching element may be directly connected to the fourth switching element.

20 Claims, 8 Drawing Sheets

SWITCHING FABRIC TOPOLOGY BASED ON TRAVERSING ASYMMETRIC ROUTES

BACKGROUND

A switching fabric may refer to a network topology in which network nodes interconnect via one or more network switches, such as crossbar switches (hereinafter called "switching elements"). A switching element may connect multiple inputs to multiple outputs in a matrix manner. If the switching element has X inputs and Y outputs, then the switching element may have a matrix with X×Y crosspoints, which are places where the "crossbars" on the switching element may cross. There may be a switch at each cross-point. When closed, the switch may connect one of the X inputs to one of the Y outputs.

SUMMARY

According to some possible implementations, a system may include a first set of 2N packet processors, a second set of 2N packet processors, and a switching fabric to interconnect the first set of 2N packet processors and the second set of 2N packet processors. N may be an integer greater than or equal to one. The switching fabric may include a first switching element having a size of at least 3N×3N, a second switching element having a size of at least 3N×3N, a third switching element having a size of at least 3N×3N, and a fourth switching element having a size of at least 3N×3N. The first switching element may be directly connected to the second switching element and the third switching element, and may be indirectly connected to the fourth switching element. The second switching element may be directly connected to the first switching element and the fourth switching element, and may be indirectly connected to the third switching element. The third switching element may be directly connected to the first switching element and the fourth switching element, and may be indirectly connected to the second switching element. The fourth switching element may be directly connected to the second switching element and the third switching element, and may be indirectly connected to the first switching element.

According to some possible implementations, a system may include a first set of 2N packet processors included in a first network device, a second set of 2N packet processors included in a second network device, and a switching fabric to interconnect the first set of 2N packet processors and the second set of 2N packet processors. N may be an integer greater than or equal to one. The switching fabric may be included in the first network device and the second network device. The switching fabric may include a first switching element, included in the first network device, having a size of at least 3N×3N. The switching fabric may include a second switching element, included in the first network device, having a size of at least 3N×3N. The switching fabric may include a third switching element, included in the second network device, having a size of at least 3N×3N. The switching fabric may include a fourth switching element, included in the second network device, having a size of at least 3N×3N. The first switching element may be directly connected to the second switching element and the third switching element, and may be indirectly connected to the fourth switching element. The second switching element may be directly connected to the first switching element and the fourth switching element, and may be indirectly connected to the third switching element. The third switching element may be directly connected to the first switching element and the fourth switching element, and may be indirectly connected to the second switching element. The fourth switching element may be directly connected to the second switching element and the third switching element, and may be indirectly connected to the first switching element.

According to some possible implementations, a system may include a set of 4N packet processors and a switching fabric to interconnect the set of 4N packet processors. The switching fabric may include a first switching element having a size of at least 3N×3N, a second switching element having a size of at least 3N×3N, a third switching element having a size of at least 3N×3N, and a fourth switching element having a size of at least 3N×3N. The first switching element may be directly connected to the second switching element and the third switching element, and may be indirectly connected to the fourth switching element. The second switching element may be directly connected to the first switching element and the fourth switching element, and may be indirectly connected to the third switching element. The third switching element may be directly connected to the first switching element and the fourth switching element, and may be indirectly connected to the second switching element. The fourth switching element may be directly connected to the second switching element and the third switching element, and may be indirectly connected to the first switching element.

DETAILED DESCRIPTION

The following detailed description of example implementations refers to the accompanying drawings. The same reference numbers in different drawings may identify the same or similar elements.

A network device (e.g., a router) may include packet processors and switching elements. A packet processor may refer to a component for processing an incoming network packet and/or an outgoing network packet. A network packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network. The network device may be located within one chassis. A maximum capacity of a switching fabric (e.g., one or more switching elements that interconnect packet processors) may limit a maximum possible bandwidth of the network device. One way to increase the maximum capacity of the switching fabric may be by merging two switching fabrics. The two switching fabrics may be connected on two chassis back-to-back to form a single switching fabric.

For a standalone chassis with 2N packet processors, a non-blocking fabric topology may be created by a 2N×2N switching element (e.g., where N is an integer ≥1). Non-blocking may refer to the degree to which a connection between an input and an output does not prevent other connections between inputs and outputs. When two chassis are connected back-to-back, there may be 4N packet processors connected to the two chassis.

One way to interconnect 4N packet processors is to use six 2N×2N switching elements in a multi-layer switching network, such as a Clos architecture. But, a multi-layer switching network may occupy a large amount of physical space, may consume a high amount of energy for power and cooling, may increase manufacturing costs, and may require a complex system design. Another way to interconnect 4N packet processors is to use a single 4N×4N switching element. But, such a large switching element may consume a high amount of energy, may increase manufacturing costs because of challenges in making the large switching element, and may require a complex system design. Implementations described herein may include a switching fabric topology that uses four 3N×3N switching elements and asymmetric routing to interconnect 4N packet processors while maintaining energy efficiency, simple design, and inexpensive manufacturing.

Figure 1:
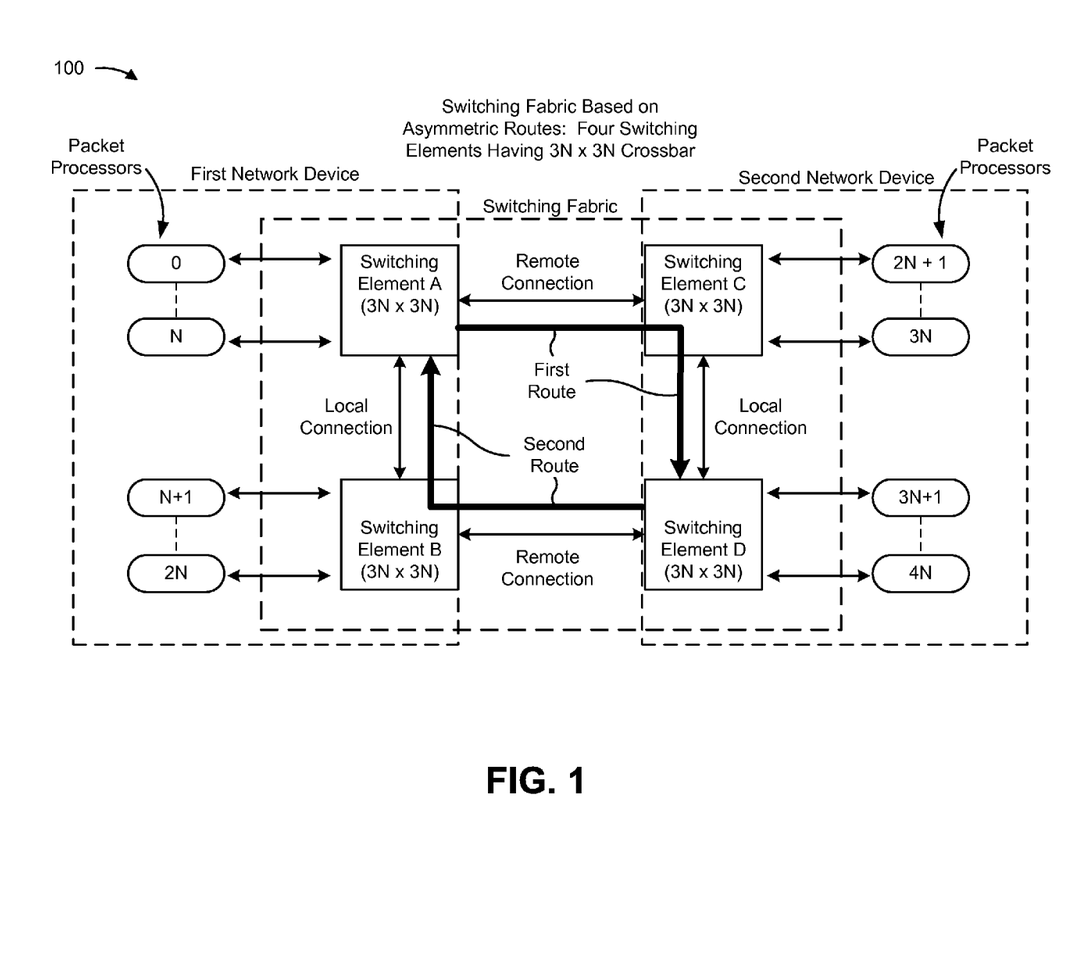
FIG. 1 is a diagram of an overview of an example implementation described herein.

FIG. 1 is a diagram of an overview of an example implementation 100 described herein. Assume that example implementation 100 includes a switching fabric that is made of four 3N×3N switching elements (e.g., a 4×3N×3N switching fabric) used to interconnect 4N packet processors. As shown, the switching fabric may include a part of two network devices. Assume further that a first network device (e.g., on a first chassis) contains two 3N×3N switching elements (e.g., shown as switching element A and switching element B). Assume further that a second network device (e.g., on a second chassis) contains two other 3N×3N switching elements (e.g., shown as switching element C and switching element D). Assume further that 2N packet processors are included in the first network device and 2N packet processors are included in the second network device, for a total of 4N packet processors interconnected by the switching fabric.

As further shown in FIG. 1, assume that switching elements A and B are connected via a local connection within the first network device, and assume that switching elements C and D are connected via a local connection within the second network device. A local connection may refer to a connection between two switching elements that are located within the same network device. Assume further that the first network device and the second network device are connected via one or more remote connections (e.g., a connection between switching elements A and C, and another connection between switching elements B and D). A remote connection may refer to a connection between two switching elements that are located within different network devices.

As further shown in FIG. 1, a network packet following a route from switching element A to switching element D may traverse a first route from switching element A, via switching element C, to switching element D. As further shown, a network packet following a route from switching element D to switching element A may traverse a second route from switching element D, via switching element B, to switching element A. As shown, the first route and the second route may be asymmetric routes that do not traverse the same set of switching elements. When traversing the first route or the second route, a network packet may traverse a remote connection before a local connection. The asymmetric nature of the routes may reduce the number and/or the size of switching elements required to interconnect 4N packet processors in a back-to-back connection (e.g., to four 3N×3N switching elements). The asymmetric nature of the routes may also enhance the non-blocking properties of the 4×3N×3N switching fabric.

In this way, a 4×3N×3N switching fabric topology that uses asymmetric routes may interconnect 4N packet processors while maintaining energy efficiency, efficient use of physical space, simpler design, and inexpensive manufacturing. The 4×3N×3N switching fabric may be used in network devices, such as edge routers, switches, core routers, or the like, to enhance bandwidth capacity and overall performance of a network.

Figure 2:
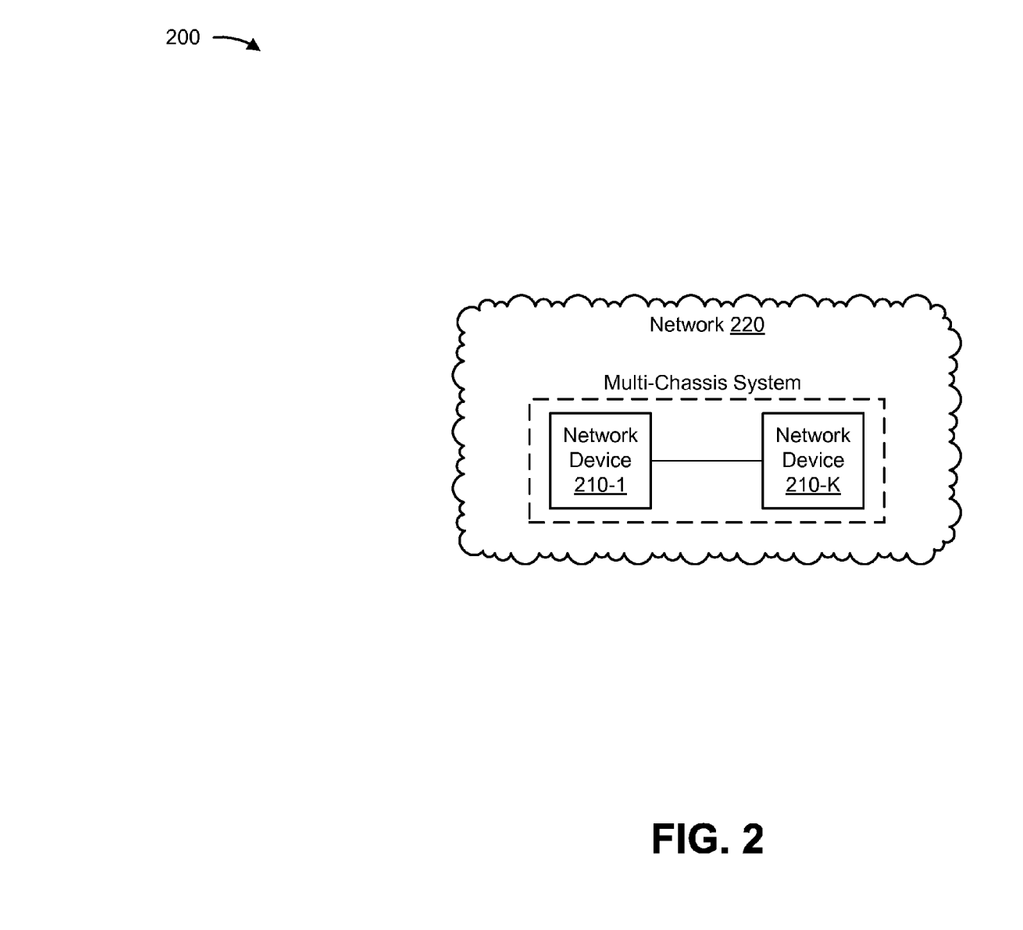
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include two or more network devices 210-1 through 210-K (K≥1) (hereinafter referred to collectively as "network devices 210," and individually as "network device 210"). In some implementations, network devices 210 may be connected (e.g., via a wired connection, via a wireless connection, or via a combination of a wired and wireless connection). As shown, network devices 210 may be included in network 220.

Network device 210 may include a device capable of receiving, transmitting, processing, routing, and/or providing network packets traversing network 220. For example, network device 210 may include one or more traffic transfer devices, such as a router, a switch, a gateway, a server, a hub, a bridge, a network interface card (NIC), an optical add-drop multiplexer (OADM), or the like. Additionally, or alternatively, network device 210 may include components such as buses, processors, memories, storage components, input components, output components, communication interfaces, and/or routing tables that enable or control the routes of network packets. In some implementations, one or more switching elements within network device 210 may be a part of a switching fabric (as shown below in FIG. 3). In some implementations, network device 210 may route a network packet, via a packet processor and a switching fabric, to another network device 210. In some implementations, network device 210 may route a network packet, via a packet processor and a switching fabric, to another device, such as a destination device (not shown).

In some implementations, network device 210 may be connected to one or more other network devices 210 to form a multi-chassis system that implements a switching fabric. In some implementations, network device 210 may be connected to one or more other network devices 210 to form a switching fabric that resides on a single chassis. In some implementations, network devices 210 may communicate with other devices (not shown), included in network 220, in order to process and/or route network packets received by network devices 210.

Network 220 may include one or more wired and/or wireless networks that include network devices 210. For example, network 220 may include a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a private network, a cloud computing network, and/or a combination of these or other types of networks. In some implementations, network 220 may include multiple network devices 210 that are connected to form a multi-chassis system, as described above.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
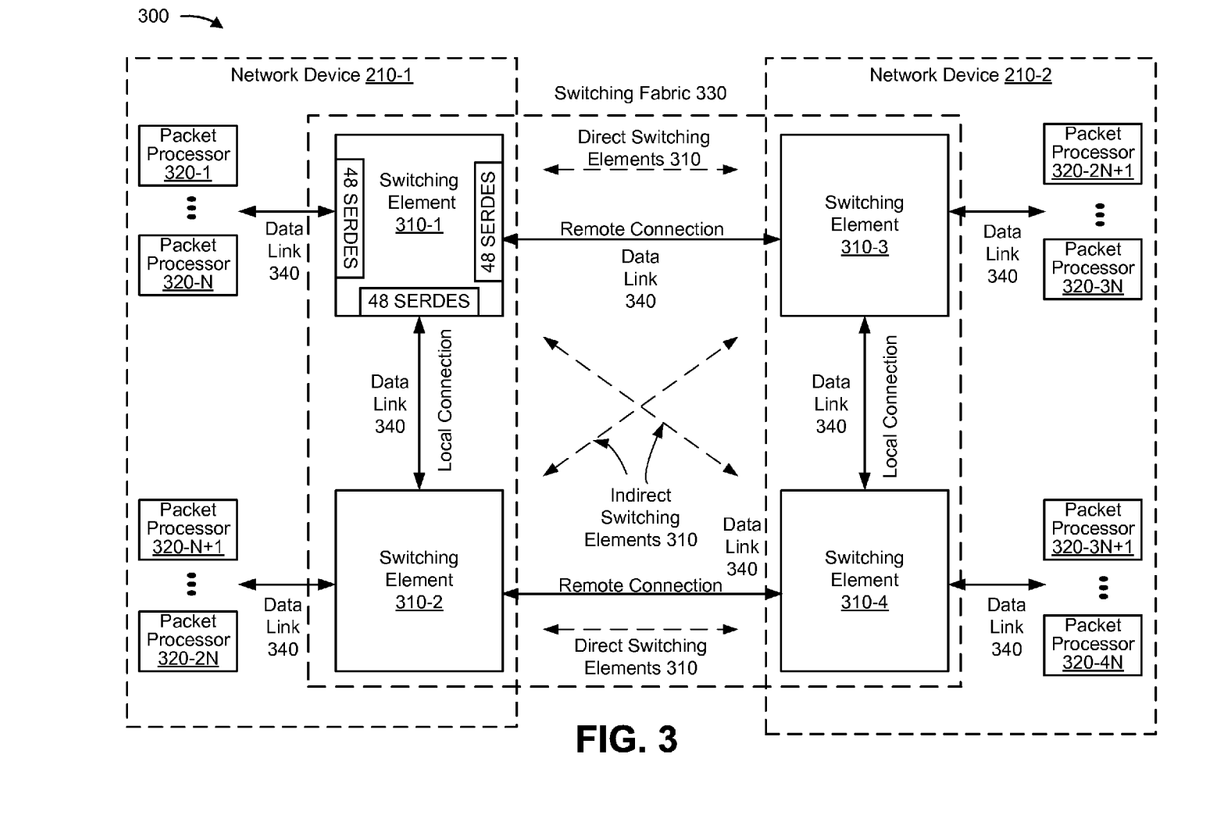
FIG. 3 is a diagram of example components of one or more devices of FIG. 2.

FIG. 3 is a diagram of example components of a device 300. Device 300 may correspond to one or more network devices 210. In some implementations, network device 210 may include one or more devices 300 and/or one or more components of device 300. As shown in FIG. 3, device 300 may include one or more switching elements 310-1 through 310-M (M≥1) (hereinafter referred to collectively as "switching elements 310," and individually as "switching element 310"), one or more packet processors 320-1 through 320-L (L≥1) (hereinafter referred to collectively as "packet processors 320," and individually as "packet processor 320"), a switching fabric 330, and one or more data links 340. For example, device 300 may include four switching elements 310, as shown. As another example, device 300 may include 4N packet processors 320 (N≥1), as shown. In some implementations, components of device 300 may interconnect via wired connections, wireless connections, or a combination of wired connections and wireless connections.

Switching element 310 may include one or more components to route a network packet. For example, switching element 310 may include a crossbar switch. Switching element 310 may route the network packet from packet processor 320 to another switching element 310 or to another packet processor 320. In some implementations, switching element 310 may route the network packet to another switching element 310 on another network device 210 via a remote connection. In some implementations, switching element 310 may route the network packet to another switching element 310 on the same network device 210 via a local connection. In some implementations, switching element 310 may include a 3N×3N switch (e.g., a 72×72 crossbar if N=24, a 144×144 crossbar for a double-linked switching fabric 330, as described below). Switching element 310 may include one or more serializers/deserializers (SERDES). A SERDES may compensate for limited input/output and/or may convert data between a serial data format and a parallel data format. In some implementations (e.g., in a double-linked switching fabric 330), switching element 310 may include 2N (e.g., 48) SERDES that interface with packet processors 320, 2N (e.g., 48) SERDES that interface with another switching element 310 connected via the local connection, and/or 2N (e.g., 48) SERDES that interface with another switching element 310 connected via the remote connection.

Packet processor 320 may include one or more components to process an incoming network packet and/or to process an outgoing network packet. For example, packet processor 320 may include a bus, a processor, an input component, and/or an output component. Packet processor 320 may manage a port or a collection of ports via which the network packet can be received and/or transmitted. Packet processor 320 may perform certain operations on the incoming network packet and/or the outgoing network packet, such as encapsulation, decapsulation, multiplexing, demultiplexing, queuing, dequeuing, and/or other operations that may facilitate the processing and/or transporting of the incoming and/or outgoing network packets by other components of network device 210. In some implementations, N packet processors 320 may be connected to a single switching element 310, for a total of 4N packet processors 320 that may be connected to four 3N×3N switching elements 310 in a 4×3N×3N switching fabric 330.

Switching fabric 330 may include one or more switching elements 310 to facilitate the routing of network packets among switching elements 310 and packet processors 320. In some implementations, switching fabric 330 may include four 3N×3N switching elements, with two 3N×3N switching elements on a first network device 210 and two 3N×3N switching elements on a second network device 210. In some implementations, first network device 210 and second network device 210 may be split apart by disconnecting the remote connections and may function as standalone switching fabrics 330 of 2×3N×3N size. For example, first network device 210 may operate as a standalone switching fabric 330 that interconnects 2N packet processors 320 instead of the 4N packet processors 320 that are interconnected by switching fabric 330 of 4×3N×3N size. Additionally, or alternatively, a standalone first network device 210 and a standalone second network device 210 may be combined to constitute a back-to-back network device 210 implementation which features switching fabric 330 of 4×3N×3N size. Additionally, or alternatively, the standalone first network device 210 and the standalone second network device 210 may be combined with other network devices 210. For example, the standalone first network device 210 may be combined with a standalone third network device 210, the standalone second network device 210 may be combined with a standalone fourth network device 210, and so on.

In some implementations, switching fabric 330 may include a switching fabric 330 of 4×6N×6N size (e.g., a double-linked switching fabric 330) if data link 340 that connects packet processor 320 and switching element 310 is a double-data link. A double-linked switching fabric 330 may include packet processors 320 that may be able to receive network packets from switching elements 310 and simultaneously provide network packets to switching elements 310. The double-linked switching fabric 330 may have increased non-blocking properties as compared to a switching fabric 330 that is not double-linked. Additionally, or alternatively, the standalone switching fabric 330 may be modified to 2×6N×6N size if data link 340 is double-linked. Double-linking may enhance the non-blocking characteristics of the standalone double-linked switching fabric 330 as compared to a standalone switching fabric 330 that is not double-linked.

Data link 340 may include one or more connections to facilitate the routing of network packets among switching elements 310 and/or packet processors 320 and to facilitate communication among switching elements 310 and/or packet processors 320. For example, data link 340 may include an optical fiber, an electrical wire, an optical waveguide, or the like. In some implementations, packet processor 320 may receive and/or provide the network packet via data link 340. In some implementations, switching element 310 may be connected to packet processor 320 via data link 340. In some implementations, data link 340 between packet processor 320 and switching element 310 may be a double-data link. In such an implementation, N packet processors 320 may be connected to switching element 310 via 2N data links 340, with two data links 340 associated with each packet processor 320. Switching element 310 may include a 6N×6N crossbar in the double-linked switching fabric 330 instead of a 3N×3N crossbar because switching element 310 may be required to handle double the quantity of data links 340. Double-data links 340 may be able to handle two-way traffic instead of one-way traffic that a single data link 340 may handle. In some implementations, data links 340 that connect two switching elements 310 located within the same network device 210 may constitute the local connection. In some implementations, data links 340 that connect two switching elements 310 located within different network devices 210 may constitute the remote connection.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
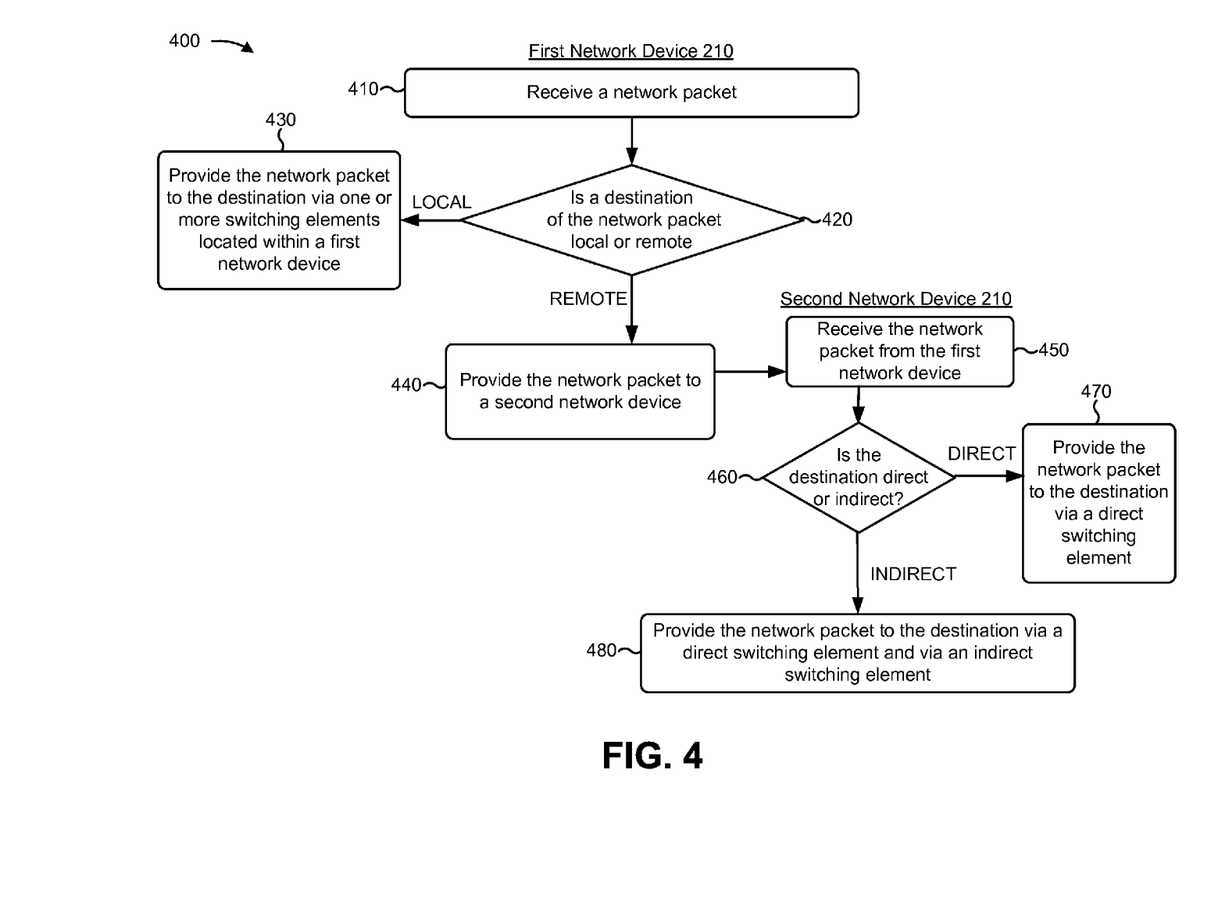
FIG. 4 is a flow chart of an example process for routing a network packet via a switching fabric topology that uses asymmetric routes.

FIG. 4 is a flow chart of an example process 400 for routing a network packet via a switching fabric topology that uses asymmetric routes. In some implementations, one or more process blocks of FIG. 4 may be performed by one or more network devices 210. In some implementations, one or more process blocks of FIG. 4 may be performed by another device or a group of devices separate from or including the one or more network devices 210.

As shown in FIG. 4, process 400 may include receiving a network packet (block 410). For example, first network device 210 may receive the network packet. First network device 210 may refer to a network device 210 that receives the network packet. In some implementations, first network device 210 may concurrently receive and provide different network packets to different packet processors 320. For example, first network device 210 may receive a network packet from a packet processor 320 that is directly connected to switching element 310 (e.g., with no intervening switching elements 310) while receiving another network packet from a packet processor 320 that is directly connected to another switching element 310.

In some implementations, packet processor 320 may receive the network packet via data link 340. For example, 2N packet processors 320 may be components of network device 210, and any one of the 2N packet processors 320 may receive the network packet.

As further shown in FIG. 4, process 400 may include determining whether a destination of the network packet is local or remote (block 420). For example, first network device 210 may determine whether a destination of the network packet is a local destination or a remote destination. A destination may refer to a destination packet processor 320 to which the network packet is output from switching fabric 330. A source may refer to a source packet processor 320 from which the network packet is received by switching fabric 330. Additionally, or alternatively, a destination may refer to a destination switching element 320 directly connected to the destination packet processor 320. Additionally, or alternatively, a source may refer to a source switching element 320 directly connected to the source packet processor 320. A local destination may refer to a destination that is on the same network device 210 as the source of the network packet. A remote destination may refer to a destination that is on a different network device 210 than the source of the network packet.

In some implementations, first network device 210 may determine whether the destination of the network packet is local or remote based on reading address information within the network packet. Address information may refer to information that identifies a network address associated with a destination of the network packet. For example, address information may include a network address, such as an Internet Protocol (IP) address, a Media Access Control (MAC) address, or the like. In some implementations, packet processor 320 may determine whether the destination of the network packet is local or remote based on reading the address information. In some implementations, first network device 210 may determine whether the destination of the network packet is local or remote based on using other packet header information or control information derived from the packet header information.

Additionally, or alternatively, first network device 210 may determine whether the destination of the network packet is local or remote by utilizing a forwarding table or a routing table that may assist in determining how to route a network packet. In some implementations, first network device 210 may utilize the forwarding table or the routing table to look up an address and determine a route for the network packet. Additionally, or alternatively, first network device 210 may determine whether the destination of the network packet is local or remote using some other method, such as based on receiving an instruction from another network device 210.

In some implementations, first network device 210 may be included in a first chassis and a second network device 210 (e.g., a network device 210 that may be connected to first network device 210 and may receive a network packet from first network device 210) may be included in a second chassis. The first chassis and the second chassis may be connected to form a switching fabric 330 of 4×3N×3N size. Additionally, or alternatively, the first chassis and the second chassis may be split apart and may operate as standalone switching fabrics 330 of 2×3N×3N size. In some standalone implementations, standalone switching fabric 330 may interconnect 2N packet processors 320 connected to first network device 210, instead of interconnecting 4N packet processors 320.

As further shown in FIG. 4, if the destination of the network packet is local (block 420—LOCAL), then process 400 may include providing the network packet to the destination via one or more switching elements located within a first network device (block 430). For example, if first network device 210 determines that the destination of the network packet is local, then first network device 210 may provide the network packet to a destination packet processor 320 via one or more switching elements 310 located within first network device 210.

Additionally, or alternatively, first network device 210 may provide the network packet to destination packet processor 320 via a switching element 310 to which destination packet processor 320 is directly connected. In such an implementation, source packet processor 320 and destination packet processor 320 may be directly connected to the same switching element 310 (e.g., directly connected with no intervening switching elements 310).

Additionally, or alternatively, first network device 210 may provide the network packet to destination packet processor 320 via multiple (e.g., two) switching elements 310 that are located within first network device 210. For example, source packet processor 320 may be directly connected to a first switching element 310 located within first network device 210 and destination packet processor 320 may be directly connected to a second switching element 310 located within first network device 210. In such an implementation, the network packet may be routed from source packet processor 320 to destination packet processor 320, via first switching element 310, via a local connection, and via second switching element 310. A local connection may refer to a data link 340 that connects two switching elements 310 located within the same network device 210. In this way, first network device 210 may provide the network packet to destination packet processor 320 via one or more switching elements 310 located within first network device 210. Providing the network packet to destination packet processor 320 may cause destination packet processor 320 to route the network packet to another network device 210.

As further shown in FIG. 4, if the destination of the network packet is remote (block 420—REMOTE), then process 400 may include providing the network packet to a second network device (block 440). For example, if first network device 210 determines that the destination of the network packet is remote, then first network device 210 may provide the network packet to second network device 210 via a remote connection. A remote connection may refer to a data link 340 that connects two switching elements 310 located within different network devices 210.

In some implementations, the network packet may traverse the remote connection before traversing the local connection when the network packet is routed between different network devices 210. Traversing the remote connection first may ensure that a network packet traveling between indirectly connected switching elements 310 (e.g., switching elements 310 that are not directly connected by a remote connection or a local connection, or switching elements 310 that are connected via an intervening switching element 310) takes different routes when traveling in different directions. The asymmetric nature of sending and receiving routes may enhance the non-blocking properties of switching fabric 330.

As further shown in FIG. 4, process 400 may include receiving the network packet from the first network device (block 450). For example, second network device 210 may receive the network packet from first network device 210 via the remote connection. In some implementations, a switching element 310 (of second network device 210) may receive the network packet from a directly connected switching element 310 (of first network device 210).

As further shown in FIG. 4, process 400 may include determining whether the destination of the network packet is direct or indirect (block 460). For example, second network device 210 may determine whether the destination is direct or indirect. A direct destination may refer to a direct switching element 310 that is a switching element 310 connected to a source switching element 310 (e.g., via a remote connection). An indirect destination may refer to an indirect switching element 310 that is a switching element 310 indirectly connected to a source switching element 310 (e.g., via a remote connection between source switching element 310 and intervening switching element 310, and via a local connection between intervening switching element 310 and indirect switching element 310).

In some implementations, first network device 210 may determine whether the destination is direct or indirect, and first network device 210 may provide this determination to second network device 220. Additionally, or alternatively, first network device 210 may cause second network device 210 to determine whether the destination is direct or indirect. In some implementations, first network device 210 may provide one or more instructions to second network device 210 to cause second network device 210 to determine whether the destination is direct or indirect. In some implementations, second network device 210 may determine whether the destination of the network packet is direct or indirect based on reading address information associated with the network packet. In some implementations, second network device 210 may determine whether the destination of the network packet is direct or indirect based on using other packet header information or control information derived from the packet header information.

In some implementations, second network device 210 may determine whether the destination of the network packet is direct or indirect by utilizing a forwarding table or a routing table that may assist in determining how to route a network packet. For example, second network device 210 may utilize the forwarding table or the routing table to look up an address and determine a route for the network packet.

As further shown in FIG. 4, if the destination of the network packet is direct (block 460—DIRECT), then process 400 may include providing the network packet to the destination via a direct switching element (block 470). For example, if second network device 210 determines that the destination is direct, second network device 210 may provide the network packet, via a direct switching element 310, to a destination packet processor 320 that is directly connected to the direct switching element 310 (e.g., a switching element 310 connected to a source switching element 310 via a remote connection). Providing the network packet to destination packet processor 320 may cause destination packet processor 320 to provide the network packet to another network device 210. In some implementations, first network device 210 may cause second network device 210 to provide the network packet to destination packet processor 320 via the direct switching element.

As further shown in FIG. 4, if the destination of the network packet is indirect (block 460—INDIRECT), then process 400 may include providing the network packet to the destination via a direct switching element and via an indirect switching element (block 480). For example, if second network device 210 determines that the destination of the network packet is indirect, second network device 210 may provide, via a direct switching element 310 and via an indirect switching element 310, the network packet to a destination packet processor 320 directly connected to the indirect switching element 310. A direct switching element 310 may refer to a switching element 310 connected to a source switching element 310 (e.g., via a remote connection). An indirect switching element 310 may refer to a switching element 310 indirectly connected to a source switching element 310 (e.g., via a remote connection between source switching element 310 and intervening switching element 310, and via a local connection between intervening switching element 310 and indirect switching element 310). Providing the network packet to destination packet processor 320 may cause destination packet processor 320 to provide the network packet to another network device 210. In some implementations, first network device 210 may cause second network device 210 to provide the network packet to destination packet processor 320 via the direct switching element and via the indirect switching element.

In this way, a switching fabric topology based on traversing asymmetric routes may increase maximum capacity while maintaining energy efficiency, efficient use of physical space, simple design, inexpensive manufacturing, and/or ease of use in the back-to-back network device context. The switching fabric topology may be used in various network devices 210 in a network (e.g., at the edges of the network, in the core of the network, etc.) to enhance the bandwidth capacity and overall performance of the network.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
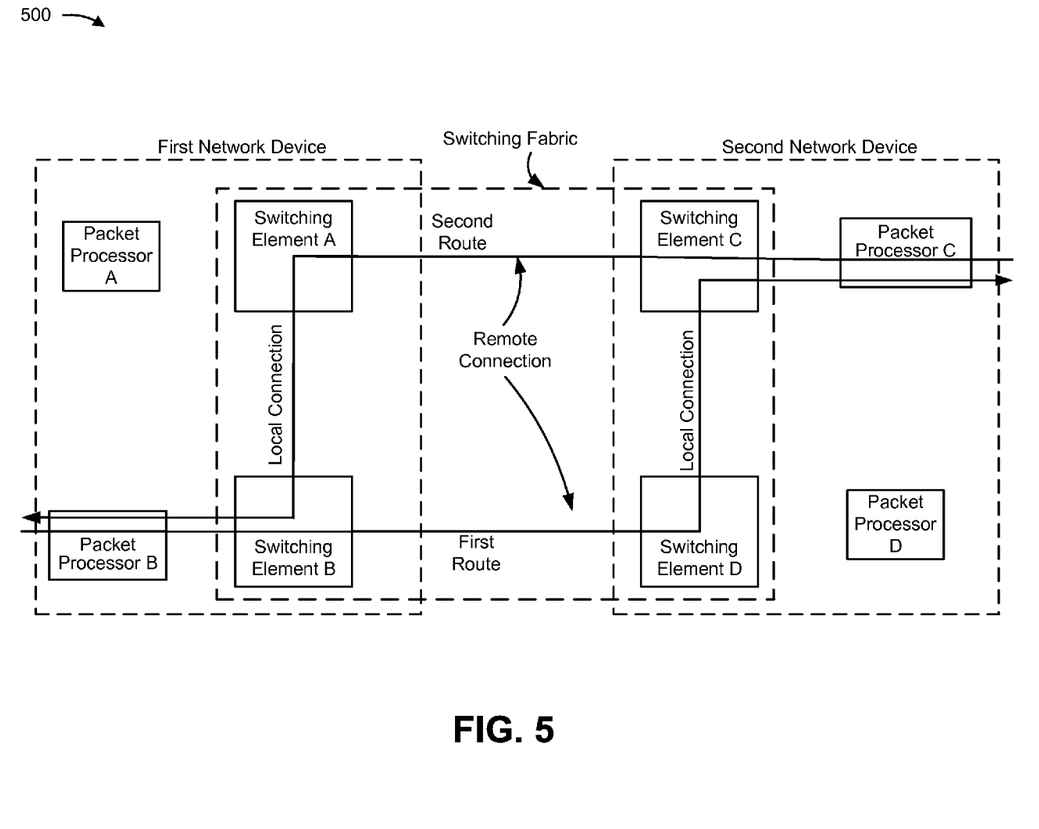
FIGS. 5-8 are diagrams of example implementations relating to the example process shown in FIG. 4.

FIG. 5 is a diagram of an example implementation 500 relating to example process 400 shown in FIG. 4. FIG. 5 shows an example of routing a network packet via a switching fabric that uses asymmetric routes.

As shown in FIG. 5, assume that example implementation 500 includes two network devices that are connected in a back-to-back manner. Assume that the network devices are connected to other network devices in a network. Assume further that example implementation 500 includes 4N packet processors (e.g., N=24 for a total of 96 packet processors) that need to be interconnected.

Assume further that implementation 500 includes a 4×3N×3N switching fabric. Assume further that a first network device (e.g., implemented within a first chassis) contains two 3N×3N switching elements (e.g., shown as switching element A and switching element B). Assume further that a second network device (e.g., implemented within a second chassis) contains two other 3N×3N switching elements (e.g., shown as switching element C and switching element D). Assume further that the switching fabric is connected to a total of 4N packet processors, where 2N packet processors are located within the first network device and 2N packet processors are located within the second network device.

Assume further that switching elements A and B are connected via a local connection within the first network device. As shown, assume that switching elements C and D are connected via a local connection within the second network device. The first network device and the second network device may be connected via a remote connection (e.g., one set of data links connecting switching elements A and C and another set of data links connecting switching elements B and D).

Assume further that the first and second network devices route a network packet from packet processor B to packet processor C via a first route. Assume further that the network devices route a network packet from packet processor C to packet processor B via a second route.

As shown in FIG. 5, on the first route, the first network device may receive a network packet at packet processor B. The first network device may determine whether the destination of the network packet is local or remote. Assume that the destination of the network packet is remote (e.g., packet processor C, which is included in the second network device, and therefore remote from the first network device). Since the destination is remote, the first network device provides the network packet to the second network device via a remote connection before providing the network packet via a local connection. The second network device may receive the network packet. The second network device may determine whether the destination of the network packet is direct or indirect. Because the destination corresponds to packet processor C, the destination of the network packet is indirect. Since the destination is indirect, the second network device provides the network packet to a destination packet processor (e.g., packet processor C) via direct switching element D and via indirect switching element C. In this way, the network packet may be transmitted from packet processor B to packet processor C on the first route. The network packet traversed elements on the first route in the following order: packet processor B, switching element B, remote connection, switching element D, local connection, switching element C, and packet processor C.

As further shown in FIG. 5, on the second route, the second network device may receive a network packet at packet processor C. The second network device may determine if the destination of the network packet is local or remote. Assume that the destination of the network packet is remote (e.g., packet processor B, which is included in the first network device, and therefore remote from the second network device). Since the destination is remote, the second network device provides the network packet to the first network device via a remote connection before providing the network packet via a local connection. The first network device may receive the network packet. The first network device may determine whether the destination is direct or indirect. Assume that the destination of the network packet is indirect. Since the destination is indirect, the first network device provides the network packet to a destination packet processor (e.g., packet processor B) via direct switching element A and via indirect switching element B. In this way, the network packet may be transmitted from packet processor C to packet processor B on the second route. The network packet traversed elements on the second route in the following order: packet processor C, switching element C, remote connection, switching element A, local connection, switching element B, and packet processor B.

As further shown, the first route and the second route are asymmetric routes that do not traverse the same set of switching elements. For example, the first route and the second route may involve traversing a remote connection before a local connection when the network packet is routed between different network devices. The asymmetric nature of the routes may enhance the non-blocking properties of the 4×3N×3N switching fabric.

In this way, a 4×3N×3N switching fabric based on traversing asymmetric routes may increase maximum capacity while maintaining energy efficiency, efficient use of physical space, simpler design, inexpensive manufacturing, and/or ease of use in the back-to-back network device context.

As indicated above, FIG. 5 is provided merely as an example. Other examples are possible and may differ from what was described with regard to FIG. 5.

Figure 6:
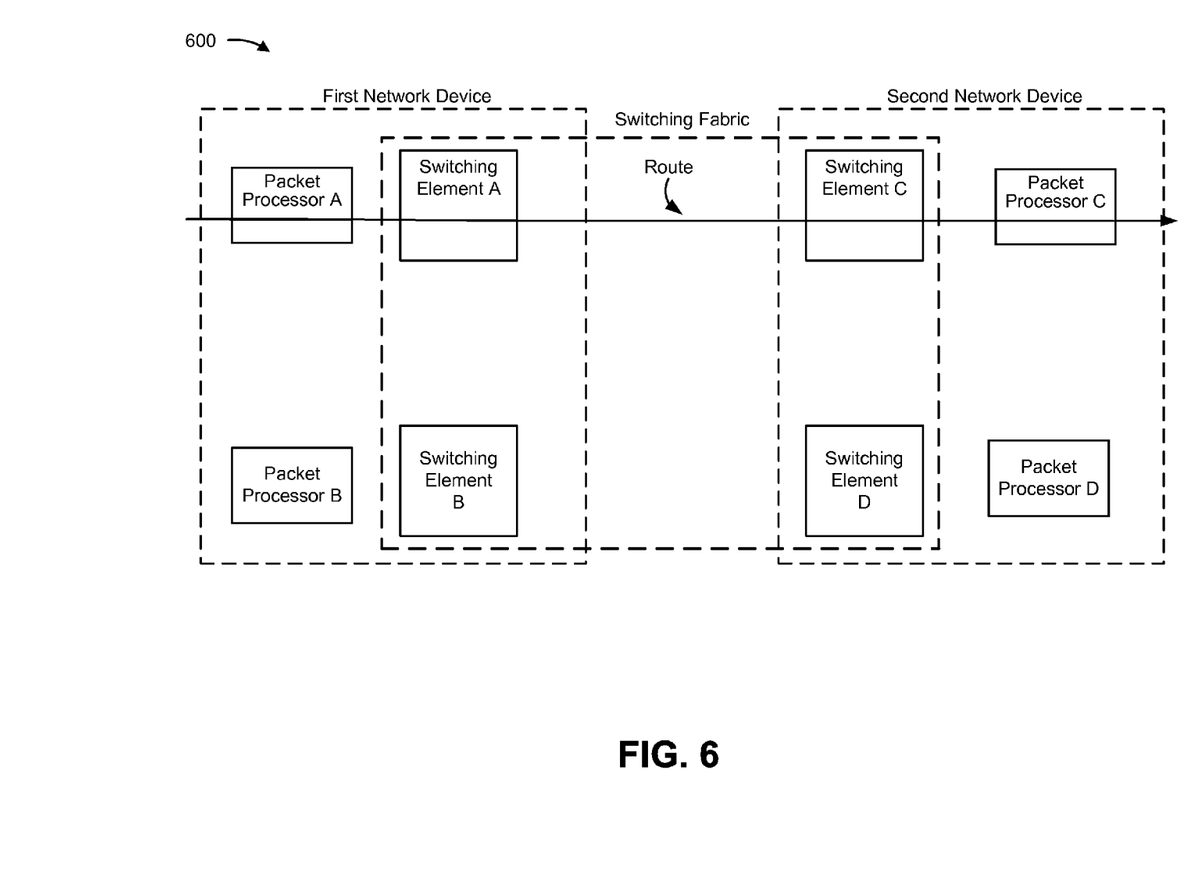

FIG. 6 is a diagram of an example implementation 600 relating to example process 400 shown in FIG. 4. FIG. 6 shows an example of routing a network packet via a switching fabric topology. Assume that the switching fabric of FIG. 6 is identical to the switching fabric of FIG. 5. Assume further that the first and second network devices of FIG. 6 are identical to the network devices of FIG. 5.

As shown in FIG. 6, assume that the first and second network devices route a network packet from packet processor A to packet processor C via a route. As shown, the first network device may receive the network packet at packet processor A. The first network device may determine if the destination of the network packet is local or remote. Assume that the destination of the network packet is remote (e.g., packet processor C, which is included in the second network device, and therefore remote from the first network device). Since the destination is remote, the first network device provides the network packet to the second network device via a remote connection. The second network device may receive the network packet. The second network device may determine whether the destination of the network packet is direct or indirect. Assume that the destination of the network packet is direct. Since the destination is direct, the second network device provides the network packet to a destination packet processor (e.g., packet processor C) via direct switching element C. In this way, the network packet may be transmitted from packet processor A to packet processor C. The network packet traversed the elements on the route in the following order: packet processor A, switching element A, remote connection, switching element C, and packet processor C. An analogous process to the process shown in FIG. 6 may be used to transmit a network packet from packet processor C to packet processor A, from packet processor B to packet processor D, and/or from packet processor D to packet processor B.

As indicated above, FIG. 6 is provided merely as an example. Other examples are possible and may differ from what was described with regard to FIG. 6.

Figure 7:
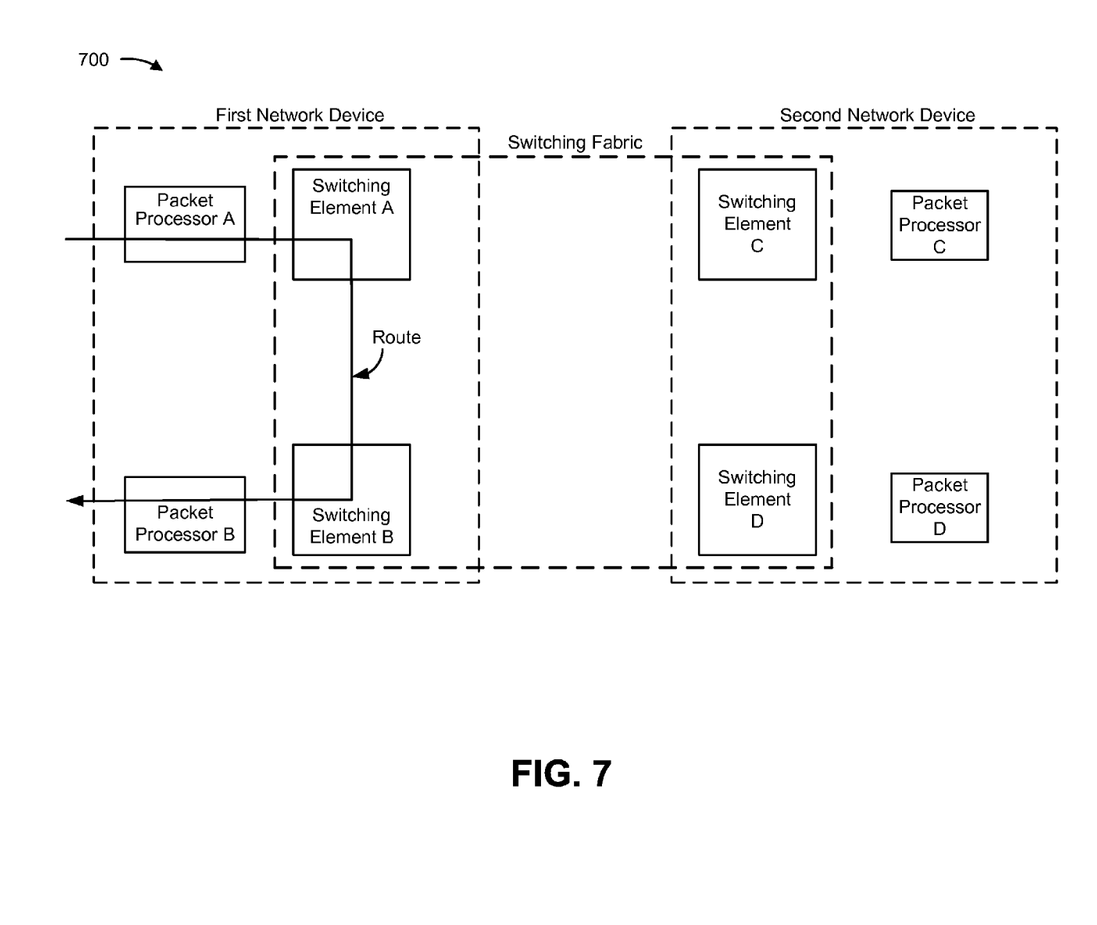

FIG. 7 is a diagram of an example implementation 700 relating to example process 400 shown in FIG. 4. FIG. 7 shows an example of routing a network packet via a switching fabric topology. Assume that the switching fabric of FIG. 7 is identical to the switching fabric of FIG. 5. Assume further that the first and second network devices of FIG. 7 are identical to the network devices of FIG. 5.

As shown in FIG. 7, assume that the first network device routes a network packet from packet processor A to packet processor B via a route. As shown, the first network device may receive the network packet at packet processor A. The first network device may determine if the destination of the network packet is local or remote. Assume that the destination of the network packet is local (e.g., packet processor B, which is included in the first network device, and therefore local to the first network device). Since the destination is local, the first network device provides the network packet to a destination packet processor via one or more switching elements located within the first network device. The first network device provides the network packet to packet processor B via switching element A and then, via switching element B. In this way, the network packet may be transmitted from packet processor A to packet processor B. An analogous process to the process shown in FIG. 7 may be used to transmit a network packet from packet processor B to packet processor A, from packet processor C to packet processor D, and/or from packet processor D to packet processor C.

As indicated above, FIG. 7 is provided merely as an example. Other examples are possible and may differ from what was described with regard to FIG. 7.

Figure 8:
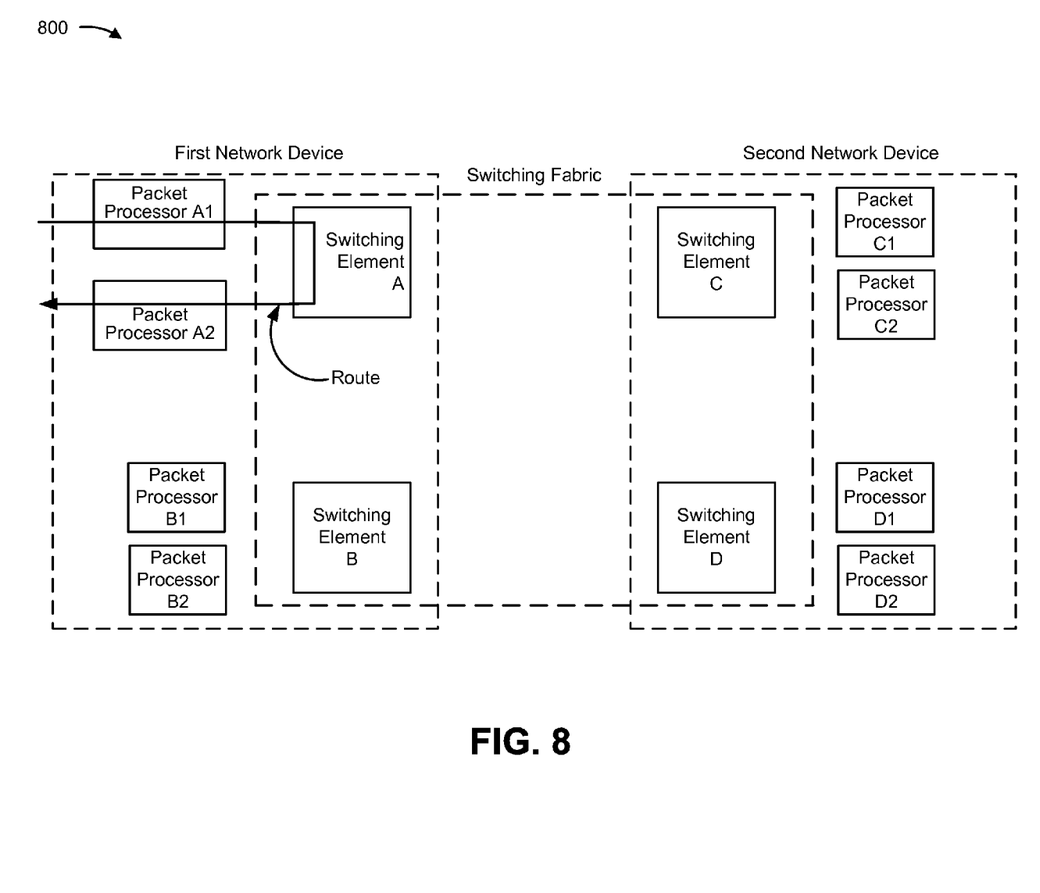

FIG. 8 is a diagram of an example implementation 800 relating to example process 400 shown in FIG. 4. FIG. 8 shows an example of routing a network packet via a switching fabric topology. Assume that the switching fabric of FIG. 8 is identical to the switching fabric of FIG. 5. Assume further that the first and second network devices of FIG. 8 are identical to the network devices of FIG. 5 (except that FIG. 8 shows two packet processors connected to a switching element).

As shown in FIG. 8, assume that the first network device routes a network packet from packet processor A1 to packet processor A2. As shown, the first network device may receive the network packet at packet processor A1. The first network device may determine if the destination of the network packet is local or remote. Assume that the destination of the network packet is local (e.g., packet processor A2, which is included in the first network device, and therefore local to the first network device). Since the destination is local, the first network device provides the network packet to a destination packet processor via one or more switching elements located within the first network device. The first network device provides the network packet to packet processor A2 via switching element A (e.g., packet processors A1 and A2 are connected to the same switching element). In this way, the network packet may be transmitted from packet processor A1 to packet processor A2. An analogous process to the process shown in FIG. 8 may be used to transmit a network packet from packet processor B1 to packet processor B2, from packet processor C1 to packet processor C2, and/or from packet processor D1 to packet processor D2.

As indicated above, FIG. 8 is provided merely as an example. Other examples are possible and may differ from what was described with regard to FIG. 8.

In this way, a switching fabric topology based on traversing asymmetric routes may increase maximum capacity while maintaining energy efficiency, efficient use of physical space, simpler design, inexpensive manufacturing, and/or ease of use in the back-to-back network device context.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A system, comprising:
    a first set of 2N packet processors,
        N being an integer greater than or equal to one;
    a second set of 2N packet processors; and
    a switching fabric to interconnect the first set of 2N packet processors and the second set of 2N packet processors, the switching fabric including a first switching element having a size of at least 3N×3N, a second switching element having a size of at least 3N×3N, a third switching element having a size of at least 3N×3N, and a fourth switching element having a size of at least 3N×3N, the first switching element being directly connected to the second switching element and the third switching element, and being indirectly connected to the fourth switching element, the second switching element being directly connected to the first switching element and the fourth switching element, and being indirectly connected to the third switching element, the third switching element being directly connected to the first switching element and the fourth switching element, and being indirectly connected to the second switching element, and the fourth switching element being directly connected to the second switching element and the third switching element, and being indirectly connected to the first switching element.

2. The system of claim 1, further comprising:
a first network device that includes the first set of 2N packet processors, the first switching element, and the second switching element; and
a second network device that includes the second set of 2N packet processors, the third switching element, and the fourth switching element,
the second network device being different from the first network device.

3. The system of claim 1, where a first chassis includes the first set of 2N packet processors, the first switching element, and the second switching element; and
where a second chassis includes the second set of 2N packet processors, the third switching element, and the fourth switching element,
the second chassis being different from the first chassis.

4. The system of claim 1, where the first switching element is connected to the second switching element via a first local connection,
the first switching element, the second switching element, and the first local connection being included within a first network device;
where the third switching element is connected to the fourth switching element via a second local connection,
the third switching element, the fourth switching element, and the second local connection being included within a second network device;
where the first switching element is connected to the third switching element via a first remote connection,
the first remote connection being between the first network device and the second network device; and
where the second switching element is connected to the fourth switching element via a second remote connection,
the second remote connection being between the first network device and the second network device.

5. The system of claim 4, where the first network device is to route a network packet via the first remote connection or the second remote connection before routing the network packet via the first local connection, when routing the network packet from the first network device to the second network device.

6. The system of claim 1, where a first set of switching elements for transmitting a network packet from the first switching element to the fourth switching element is different from a second set of switching elements for transmitting a network packet from the fourth switching element to the first switching element.

7. The system of claim 1, where the first switching element has a size of 6N×6N;
where the second switching element has a size of 6N×6N;
where the third switching element has a size of 6N×6N; and
where the fourth switching element has a size of 6N×6N.

8. A system, comprising:
a first set of 2N packet processors included in a first network device,
N being an integer greater than or equal to one;
a second set of 2N packet processors included in a second network device; and
a switching fabric to interconnect the first set of 2N packet processors and the second set of 2N packet processors,
the switching fabric being included in the first network device and the second network device,
the switching fabric comprising:
a first switching element, included in the first network device, having a size of at least 3N×3N,
a second switching element, included in the first network device, having a size of at least 3N×3N,
a third switching element, included in the second network device, having a size of at least 3N×3N, and
a fourth switching element, included in the second network device, having a size of at least 3N×3N,
the first switching element being directly connected to the second switching element and the third switching element, and being indirectly connected to the fourth switching element,
the second switching element being directly connected to the first switching element and the fourth switching element, and being indirectly connected to the third switching element,
the third switching element being directly connected to the first switching element and the fourth switching element, and being indirectly connected to the second switching element, and
the fourth switching element being directly connected to the second switching element and the third switching element, and being indirectly connected to the first switching element.

9. The system of claim 8, where the first network device is different from the second network device.

10. The system of claim 8, where the first set of 2N packet processors is directly connected to the first switching element or the second switching element; and
where the second set of 2N packet processors is directly connected to the third switching element or the fourth switching element.

11. The system of claim 8, where the first set of 2N packet processors includes:
a first set of N packet processors directly connected to the first switching element, and
a second set of N packet processors directly connected to the second switching element; and
where the second set of 2N packet processors includes:
a third set of N packet processors directly connected to the third switching element, and
a fourth set of N packet processors directly connected to the fourth switching element.

12. The system of claim 8, further comprising:
  2N serializer-deserializers, associated with the first switching element, that interface with a portion of the first set of 2N packet processors;
  2N serializer-deserializers, associated with the first switching element, that interface with the second switching element; and
  2N serializer-deserializers, associated with the first switching element, that interface with the third switching element.

13. The system of claim 8, where the first switching element is connected to the second switching element via a first local connection,
  the first local connection being included within the first network device;
  where the third switching element is connected to the fourth switching element via a second local connection,
    the second local connection being included within the second network device;
  where the first switching element is connected to the third switching element via a first remote connection,
    the first remote connection being between the first network device and the second network device; and
  where the second switching element is connected to the fourth switching element via a second remote connection,
    the second remote connection being between the first network device and the second network device.

14. The system of claim 13, where the first network device is to route a network packet via the first remote connection or the second remote connection before routing the network packet via the first local connection, when routing the network packet from the first network device to the second network device.

15. A system, comprising:
  a set of 4N packet processors,
    N being an integer greater than or equal to one; and
  a switching fabric to interconnect the set of 4N packet processors,
    the switching fabric including a first switching element having a size of at least 3N×3N, a second switching element having a size of at least 3N×3N, a third switching element having a size of at least 3N×3N, and a fourth switching element having a size of at least 3N×3N,
      the first switching element being directly connected to the second switching element and the third switching element, and being indirectly connected to the fourth switching element,
      the second switching element being directly connected to the first switching element and the fourth switching element, and being indirectly connected to the third switching element,
      the third switching element being directly connected to the first switching element and the fourth switching element, and being indirectly connected to the second switching element, and
      the fourth switching element being directly connected to the second switching element and the third switching element, and being indirectly connected to the first switching element.

16. The system of claim 15, where the first switching element has a size of 3N×3N;
  where the second switching element has a size of 3N×3N;
  where the third switching element has a size of 3N×3N; and
  where the fourth switching element has a size of 3N×3N.

17. The system of claim 15, where the first switching element has a size of 6N×6N;
  where the second switching element has a size of 6N×6N;
  where the third switching element has a size of 6N×6N; and
  where the fourth switching element has a size of 6N×6N.

18. The system of claim 15, where a first route for transmitting a first network packet from the first switching element to the fourth switching element is asymmetric with regard to a second route for transmitting a second network packet from the fourth switching element to the first switching element.

19. The system of claim 15, where a single chassis includes the set of 4N packet processors and the switching fabric.

20. The system of claim 15, where a first chassis includes:
  a first set of 2N packet processors of the set of 4N packet processors,
  the first switching element, and
  the second switching element; and
  where a second chassis includes:
    a second set of 2N packet processors of the set of 4N packet processors,
    the third switching element, and
    the fourth switching element,
    the second chassis being different from the first chassis.

* * * * *